Dec. 23, 1924.
F. LAWACZECK
AUTOMATIC THRUST BEARING
Filed Aug. 24, 1921
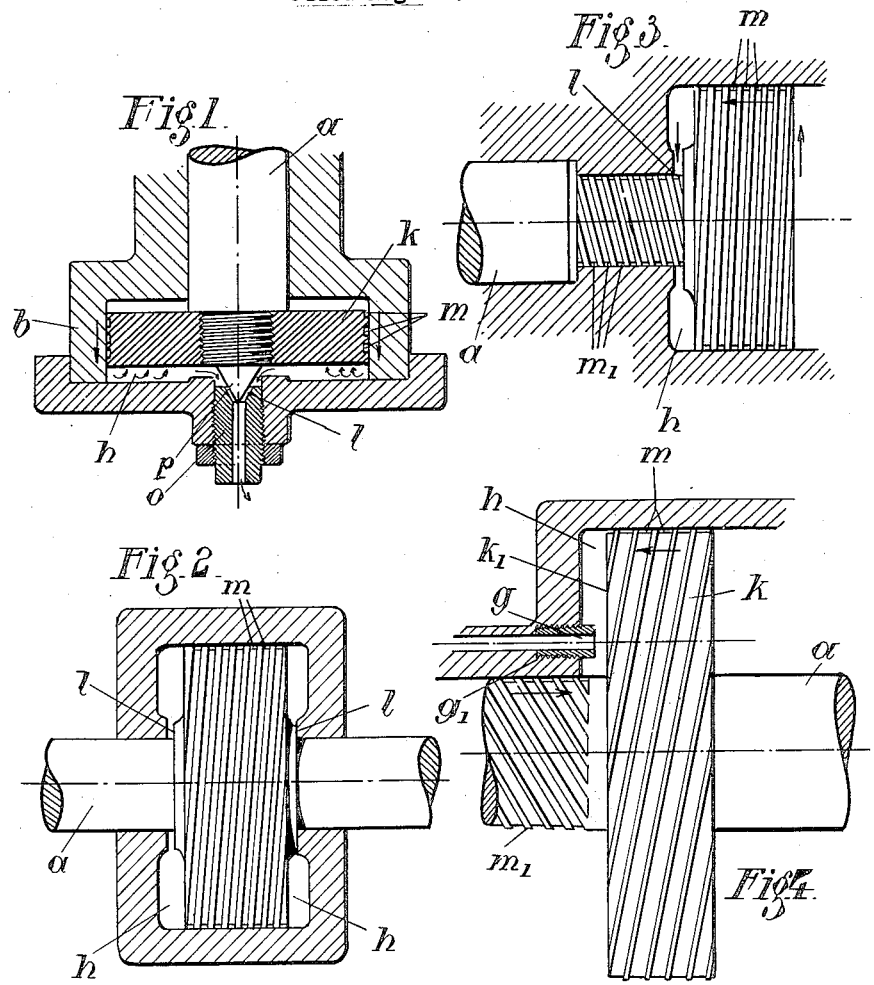
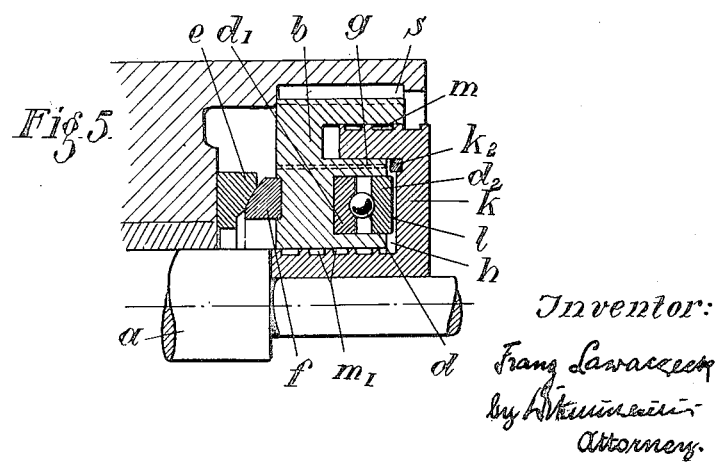

Patented Dec. 23, 1924.

1,520,356

UNITED STATES PATENT OFFICE.

FRANZ LAWACZECK, OF POCKING, UPPER-BAVARIA, GERMANY.

AUTOMATIC THRUST BEARING.

Application filed August 24, 1921. Serial No. 494,895.

(GRANTED UNDER THE PROVISIONS OF THE ACT OF MARCH 3, 1921, 41 STAT. L., 1313.)

*To all whom it may concern:*

Be it known that I, FRANZ LAWACZECK, a citizen of Germany, residing at Pocking, Upper-Bavaria, Germany, have invented certain new and useful Improvements in Automatic Thrust Bearings (for which I have filed applications in Germany, November 26, 1915, June 27, 1916, June 28, 1916; England, June 10, 1920; Sweden, June 28, 1920; Switzerland, June 28, 1920; Italy, June 30, 1920; France, July 7, 1920), of which the following is a specification.

My invention relates to bearings for taking up or balancing the thrust of a shaft and more especially to bearings of that type, which utilize the axial movement of the shaft to adjust a gap of variable width in such a manner, that the force acting upon a relief disc is automatically adjusted in correspondence with the magnitude of the thrust.

As compared with known bearings of this kind, which employ a pump driven by the shaft for generating the pressure in the relief liquid, my improved device involves the advantage that the shaft is not merely employed as driving element but itself forms the pump. This considerably simplifies the construction of the device. By employing pumps, the action of which is based upon the viscosity of the pressure liquid, the working safety of the improved device is increased, as the operation of the viscosity pumps and their characteristic, which shows the interdependence between pressure and delivery, adapts itself in a special manner to the requirements regarding pressure and quantity of the pressure exerting liquid resulting from the gap pressure regulation. The employment of a viscosity pump for the balancing device further enables the device to be easily carried out in such a manner that it takes up axial thrusts of varying directions without being confined to a position near the end of the shaft, as was the case hitherto.

Where fine screw threads are employed to form the viscosity pump, which are cut into the shaft or the casing surrounding it, provision with regard to packing the working portions of the pump is unnecessary. In such a case the pump merely consists of part of the shaft, the thrust of which is being balanced, and a surrounding cylinder which may at the same time be formed as a bearing for the shaft. The screw threads, which produce the pressures based upon viscosity action, are as a rule shallower than 1 mm., frequently they are made 0.3 mm. only and even less, their width thus forming a multiple of their depth. This statement appears necessary in view of the fact that for the sake of clearness in the drawings the grooves are shown considerably deeper than actually made.

In the drawings affixed to this specification and forming part thereof, several modifications of a bearing embodying my invention are illustrated diagrammatically by way of example. In the drawings—

Fig. 1 is an axial section of a footstep-bearing,

Fig. 2 a like view of a bearing adapted to compensate pressures in varying directions.

Figs. 3 and 4 are slightly differing forms of a bearing adapted for taking up the axial thrust and Fig. 5 is a partial axial section of a thrust ball-bearing according to the present invention.

Referring to Fig. 1, which shows an automatically balanced footstep bearing, the vertical shaft *a* carries at its lower end a piston *k* which together with the casing *b* forms the pressure chamber *h*. Screw threads or spiral grooves *m* arranged on the circumference of the piston *k* form the pump, which conveys the oil or the like into the pressure chamber *h*, so that the shaft and the load supported by it is taken up by the layer of oil below the piston *k*. The control of the quantity of oil and the pressure in the chamber *h* and the adjustment of the shaft, is effected in the modification illustrated by a needle valve *p*, the seat of which is adapted to be adjusted from outside. This control may, however, be effected in other ways.

The arrangement further shows that the problem how to effect the packing of the pressure chamber *h* does not arise at all, owing to the employment of the screw thread pump *m*, inasmuch as the pump *m* itself takes the place of the packing.

If the shaft, whose axial thrust should be taken up, changes its direction of rotation and if hereby the axial thrust also changes its direction, which will happen in most cases, the above described compensation device may also be applied by arranging two pressure chambers $h$ symmetrically to the screw thread pump, for instance in the manner shown in Fig. 2, with supporting gaps $l$ or the like for throttling the passage of the oil, while the screw pump $m$ itself need not be modified in any way.

In case that too much oil should be consumed in relieving the end thrust, the arrangement disclosed in Fig. 3 will prove useful. In this case there is provided in the oil gap besides the viscosity pump $m$ acting to generate the balancing pressure another, preferably a weaker pump $m^1$. Both pumps work counter to one another and thus increase the pressure obtainable with a diminished consumption of oil. This arrangement of two opposite screw threads serves at the same time for partly removing another serious drawback of the thrust bearing relief device. In order to obtain the necessary sensitiveness of regulation the width of the throttling gap $l$ had hitherto to be made so small, that there arose the danger of direct contact and biting of the throttling surfaces. By employing the counter thread $m^1$ which greatly assist the throttling effect exerted by the gap, the width of the throttling gap $l$ increases to a multiple of the ordinary width, without unfavourably interfering with the sensitiveness of the regulation.

The disadvantage of too narrow a regulating gap is removed according to the invention and the throttling gap is made as wide as desired by replacing it by one or a plurality of openings or apertures located at some place within the pressure chamber. A device of this kind is shown in Fig. 4. Here the annular regulating gap surrounding the shaft is replaced by an aperture which may be disposed at any suitable place in the pressure chamber $h$, for instance in the piston $k$ or in the opposite wall as indicated at $g$. In this manner not only the quantity of oil introduced into the pressure chamber $h$ can be considerably increased by imparting to the grooves $m$, which hitherto served as packing screw thread, the character of a supply pump without enlarging the space required for the device, but above all the throttling capacity of the new regulating element formed by the opening $g$ can be made as high as desired, as the available area of the outlet for the oil from the pressure chamber $h$ can be made as small as desired, in contradistinction to the circumferential area of an annular gap. In this way the distance between the regulating portion of the piston face $k^1$ and the face of the detachable nipple $g$ into which the throttling bore $g$ is preferably placed, is always so large, that no difficulties arise in working.

If an abutting surface should also be available for the state of rest, the throttle bores $g$ may be located in a somewhat projecting ring, which in order to reduce the generation of heat may preferably be made very narrow, in which case the openings $g$ may be made of oblong cross-section.

Two special branches for which the invention is applicable will now be more fully discussed.

Modifications such as disclosed in Figs. 3 and 4 lend themselves with special advantage to taking up or balancing the thrust of the propeller shafts of ships. The balancing device may for example be employed in conjunction with the usual collar thrust bearing for ships and be arranged in line with it upon the shaft in such a manner, that the collar bearing takes up the thrust at low speeds while the balancing device according to the present invention comes gradually into action as the speed rises. in this way the usual collar bearing may be made considerably smaller than was heretofore possible. Furthermore the working safety increases considerably.

Another branch of engineering in which the novel device may be employed with advantage are thrust ball-bearings, which at high speeds cannot be considered absolutely safe, while at low speeds they carry large loads securely. A simple and compact construction suitable for foot ball bearings may for instance be obtained by disposing the ball bearing in the compression chamber of the compensating device between the casing and the working piston, which latter preferably closes the compression chamber towards the outside by a fine oil-supplying screw thread.

A device of this kind is illustrated in Fig. 5. In the part $b$ of the casing, which does not take part in the rotation of the shaft $a$ is disposed the supporting ring $d^1$ for the ball bearing $d$, the other ring $d^2$ of which abuts against the piston $k$ fixed upon the shaft and acting as compensating or balancing body. On its outer circumference or on its circumference forming a slip ring (or on both) the piston $k$ is provided with fine screw thread $m$, which during working gradually pumps oil or the like into the pressure chamber $h$ between the part $b$ of the casing and the piston $k$, which when the screw thread $m$ is appropriately dimensioned generates a pressure in the chamber $h$ which rises with the number of revolutions. This pressure finally reaches such a height that the thrust on the inner face of the piston suffices to take up the axial thrust of the shaft. The pressure of the oil can be regulated by the gap situated between the ball seating ring $d^1$ and the face of the piston. If, on the internal and external circumference of the loose-ball race ring $d^2$ a screw thread is provided, so that these screw threads withdraw oil from the interior of the ball bearing, the loose ring $d^2$ remains permanently in contact with the balls and finally comes to rest when the thrust relief device comes into action.

In view of the fineness of the gap formed by the screw thread surfaces $(m)$, it is advisable to enable the part $b$ of the casing to be adjusted in a radial direction. This radial adjustment of the part $b$ may be effected by the key $s$, which prevents the rotation in conjunction with a set of rings $e, f$ with a spherical surface and a face at right angles to the shaft.

It is further advisable as in the construction according to Fig. 4 to arrange in the gap through which the oil passes when escaping, a screw thread $m^1$ extending in reverse sense to the supply screw thread $m$. If this screw thread $m^1$ is so constructed that it conveys oil into the pressure chamber $h$, the discharge and the regulation of the pressure oil is suitably effected by a regulating or throttling opening disposed at some suitable place within the pressure chamber in such a manner, that the piston enlarges the passage area for the oil when it is lifted off the thrust ball bearing, for instance by means of an interchangeable ring face $k^2$.

I wish it to be understood that I do not desire to be limited to the constructions shown and described, as a great number of modifications will readily occur to a person skilled in the art.

I claim:

1. In a shaft bearing in combination, a shaft, a pressure chamber with a throttling nozzle surrounding part of said shaft, a viscosity pump adapted to convey liquid into said chamber and means for varying the width of said nozzle.

2. In a shaft bearing in combination, a shaft, a pressure chamber with a throttling nozzle surrounding part of said shaft, a viscosity pump adapted to convey liquid into said chamber and means comprising a valve for varying the width of said nozzle in dependency upon axial motion of said shaft.

3. In a shaft bearing in combination, a shaft, a collar on said shaft, a pressure chamber surrounding said collar and the adjoining portion of said shaft and a viscosity pump adapted to convey liquid into said chamber.

4. In a shaft bearing in combination, a shaft, a collar on said shaft, a pressure chamber surrounding said collar and the adjoining portion of said shaft and a viscosity pump forming part of said collar and adapted to convey liquid into said chamber.

5. In a shaft bearing in combination, a shaft, a pressure chamber surrounding part of said shaft, another part extending through the wall of said chamber, a viscosity thread pump within said chamber and another viscosity thread pump adapted to act in an opposite sense arranged in one of the contacting surfaces of said wall and said shaft, respectively.

6. In a shaft bearing in combination, a shaft, a pressure chamber surrounding part of said shaft, another part extending through the wall of said chamber a viscosity thread pump within said chamber and another viscosity thread pump adapted to act in an opposite sense to and of another capacity than said first viscosity thread pump arranged on that part of the shaft which extends through said casing.

7. In a shaft bearing in combination, a shaft, a casing surrounding part of said shaft, a viscosity pump adapted to convey liquid into the space intermediate said shaft and said casing and means projecting into said space, one of the walls confining said space being provided with an opening for varying the pressure within said space.

8. In a shaft bearing in combination, a shaft, a pressure chamber surrounding part of said shaft, a viscosity pump adapted to convey liquid into said chamber and a thrust ball bearing adapted to take up the thrust at low speed and to be relieved by said pump at higher speed.

9. In a shaft bearing in combination, a shaft, a pressure chamber surrounding part of said shaft, a viscosity pump adapted to convey liquid into said chamber and a thrust ball bearing within said chamber adapted to take up the thrust at low speed and to be relieved by said pump at higher speed.

In testimony whereof I affix my signature.

FRANZ LAWACZECK.